United States Patent [19]

Sato et al.

[11] Patent Number: 5,042,912

[45] Date of Patent: Aug. 27, 1991

[54] X-SHAPED OPTICAL DEVICE WITH TRANSPARENT RECTANGULAR-SOLID MEMBER FOR COLOR DISPLAY

[75] Inventors: Makoto Sato, Fussa; Tatsuo Shimazaki, Tokyo, all of Japan

[73] Assignee: Casio Computer Co., Ltd., Tokyo, Japan

[21] Appl. No.: 533,490

[22] Filed: Jun. 5, 1990

[30] Foreign Application Priority Data

Jun. 8, 1989 [JP] Japan ................................ 1-144065
Jun. 8, 1989 [JP] Japan ................................ 1-144066

[51] Int. Cl.$^5$ .......................................... G02B 27/10
[52] U.S. Cl. ................................ 359/638; 359/601; 359/589
[58] Field of Search ............ 350/171, 169, 174, 276 R, 350/166, 286, 287

[56] References Cited

U.S. PATENT DOCUMENTS 2,604,808  7/1952  Suchtleben ........................ 350/171
2,973,683  3/1961  Rowe et al. ....................... 350/174

FOREIGN PATENT DOCUMENTS

212719   11/1958  Australia ........................... 350/171
0331326  9/1989  European Pat. Off. .
63-196192 8/1988  Japan .
212902   9/1988  Japan ................................ 350/286

Primary Examiner—Jon W. Henry
Attorney, Agent, or Firm—Frishauf, Holtz, Goodman & Woodward

[57] ABSTRACT

An elongated X-shaped prism comprising an X-shaped combination of four transparent plates and one central rectangular solid block member. The four transparent plates are disposed in an X-shaped state and each has one side edge adhered to a corresponding side-face of the central member, the width of each side-face of the central member being equal to thickness of each of the four transparent plates. The central member has a refraction index which is higher than the refraction index of the transparent plates. One side surface of the transparent plates is coated with an optical layer.

24 Claims, 5 Drawing Sheets

X-SHAPED OPTICAL DEVICE WITH TRANSPARENT RECTANGULAR-SOLID MEMBER FOR COLOR DISPLAY

BACKGROUND OF THE INVENTION

1. Field of the Invention

The present invention relates to an elongated X-shaped prism used for synthesis and/or separation of lights and more particularly to a projection type display apparatus for synthesizing image light components from a plurality of display elements into one image light with use of an elongated X-shaped prism and for projecting the image light onto a plane of projection.

DESCRIPTION OF THE PRIOR ART

Projection type display apparatuses which display an image on a display device such as a liquid crystal display panel and a cathode-ray tube, which enlarge the image with a projection lens, and which thereby display the enlarged image on a plane of projection such as a screen are well known in the prior art.

One of these conventional projection type display apparatus is provided with a single display device and projects image light from the display device onto a projection plane. Other one of the display apparatus is provided with a plurality of display devices and synthesizes image light components from these display devices into one image light to project the same onto a projection screen. One example of the display apparatus having a plurality of display devices is provided with three display devices, such as for displaying a red colored image, a green colored image and a blue colored image, and synthesizes red, green and blue colored image light components into a color image light with an image light synthesizer, thereby projecting the synthesized image light onto a projection plane to display the color image. Other examples of display apparatuses are provided with two display devices, one display device for displaying an image light component of one color or two colors out of red, green and blue colors, and the other display device for displaying an image light component of the complementary colors. Again the image light components from these display devices are synthesized into a color image light, and the synthesized color image ligt is projected onto a projection screen to display the same.

Figure 1:
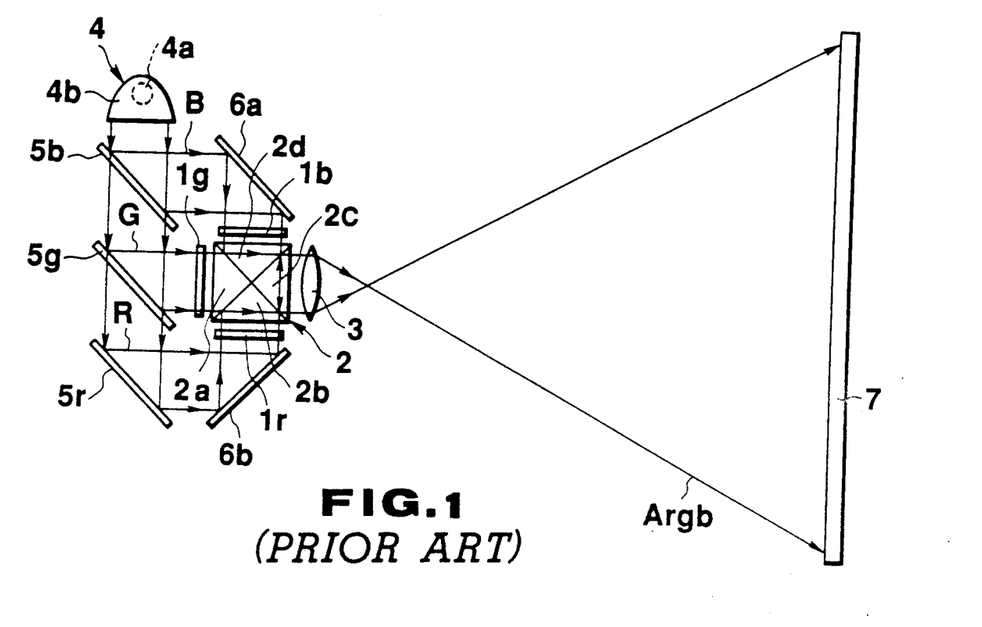
FIG. 1 is a view showing a conventional projection type display apparatus using a cubic dichroic prism.
Figure 2:
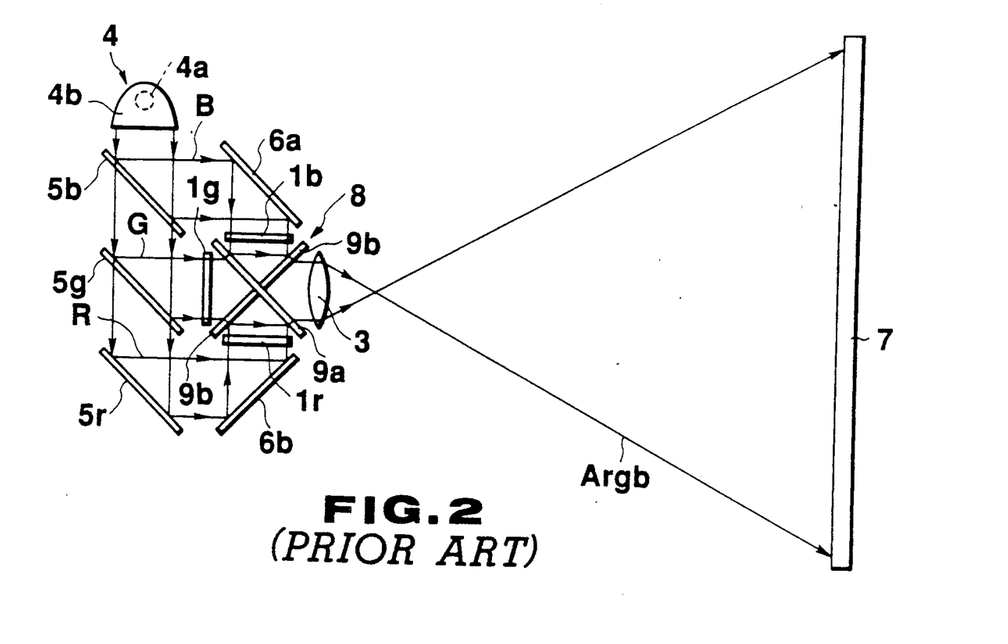
FIG. 2 is a view showing other conventional projection type display apparatus using an elongated X-shaped dichroic prism.

FIGS. 1 and 2 are views illustrating a conventional projection type display apparatus in which image lights from a plurality of display devices are synthesized into one image light and the image light thus synthesized is projected onto a projection plate. These display apparatuses employ three liquid crystal display panels as display devices for displaying a red colored image, green colored image and blue colored image, and for synthesizing three image lights of red, green and blue colors into one image light, thereby projecting the thus synthesized image light onto a screen to display the image.

The display apparatus illustrated in FIG. 1 will be described hereafter. In FIG. 1, symbols 1r, 1g and 1b denote three liquid crystal display panels of the same construction, respectively. These liquid crystal display panels 1r, 1g and 1b are driven in synchronism with each other. The first liquid crystal display panel 1r is for displaying a red colored image, the second liquid crystal display panel 1g for displaying a green colored image and the third liquid crystal display panel 1b for displaying a blue colored image. Symbol 2 denotes an image light synthesizer element for synthesizing image lights of red, green and blue colors from the above liquid crystal display panels 1r, 1g and 1b. The image light synthesizer element 2 is a square-shaped dichroic prism which is comprised of four trigonal prisms 2a, 2b, 2c and 2d, which are stuck on each other. Mating surfaces between the four trigonal prisms are coated with a dichroic coating layer. The display panels 1r, 1g and 1b are disposed in front of three incident boundary surfaces of the image light synthesizer element 2, respectively, as shown in FIG. 1, and are also disposed such that the optical axes of the display panels intersect at the center of the image light synthesizer element 2. Disposed in front of the outgoing surface of the image light synthesizer element 2 is a projection lens 3. Symbol 4 stands for a light source, which is comprised of a light source lamp 4a and a reflector 4b for reflecting lights emitted from the light source lamp 4a as parallel light beams. In front of the light source lamp 4a, there are disposed three dichroic mirrors 5b, 5g and 5r at an angle of 45 degrees to the parallel light beams. The dichroic mirror 5b serves to reflect light component of blue color and to transmit light components of other colors, thereby separating blue-color light component from other light components. The dichroic mirror comprises a transparent plate such as a glass plate, one surface of which is coated with a dichroic coating. The dichroic mirror 5g serves to reflect the light component of green color and to transmit light components of other colors, thereby separating the green-color light component from other light components. Similarly, the dichroic mirror 5r serves to reflect the light component of red color and to transmit light components of other colors, thereby separating the red-color light component from other light components. The dichroic mirror 5g is disposed so as to directly face the green-colored image display panel 1g. The dichroic mirror 5b is disposed to face the blue-colored image display panel 1b through a mirror 6a. Similarly, the dichroic mirror 5r is disposed to face the red-colored image display panel 1r through a mirror 6b.

In the projection type display apparatus, the light emitted from the light source 4 is separated into red color light component R, green color light component G and blue color light component B by the dichroic mirrors 5r, 5g and 5b, respectively, and these light components R, G, B are transmitted to the display panels 1r, 1g and 1b to display a red-colored image, greencolored image and blue-colored image, respectively. The red color image light, green color image light and blue color image light passing through the display panels 1r, 1g and 1b are further transmitted to the image light synthesizer element 2 to be combined into one color image light Argb. Then, the color image light Argb combined by the image light synthesizer element 2 is enlarged and projected through the projection lens 3 onto a projection screen 7.

In case the display panels 1r, 1g and 1b are disposed as illustrated in FIG. 1, the interface between the trigonal prisms 2a and 2d of the image light synthesizer element 2 and the interface between the trigonal prisms 2b and 2c may be coated with a dichroic coating which reflects the light component of blue color and allows light components of red color and green color to pass through the dichroic coating, and the interface between the trigonal prisms 2a and 2b and the interface between the trigonal prisms 2d and 2c may be coated with a dichroic coating which the reflects light component of red color and allows light components of green and blue colors to pass through the coating. In the arrangement described above, the green-colored image light from the green-colored image display panel 1g is allowed to pass through all of the above-mentioned dichroic coating layers, thereby being transmitted to the image light synthesizer element 2. The red-colored image light from the red-colored image display panel 1r is reflected from the dichroic coating layers, thereby being trasmitted to the image light synthesizer element 2. And the blue-colored image light from the red-colored image display panel 1b is also reflected from the dichroic coating layers, thereby being transmitted to the image light synthesizer element 2. The red-colored image light, green-colored image light and blue-colored image light are combined into one color image light by the image light synthesizer element 2.

Figure 3:
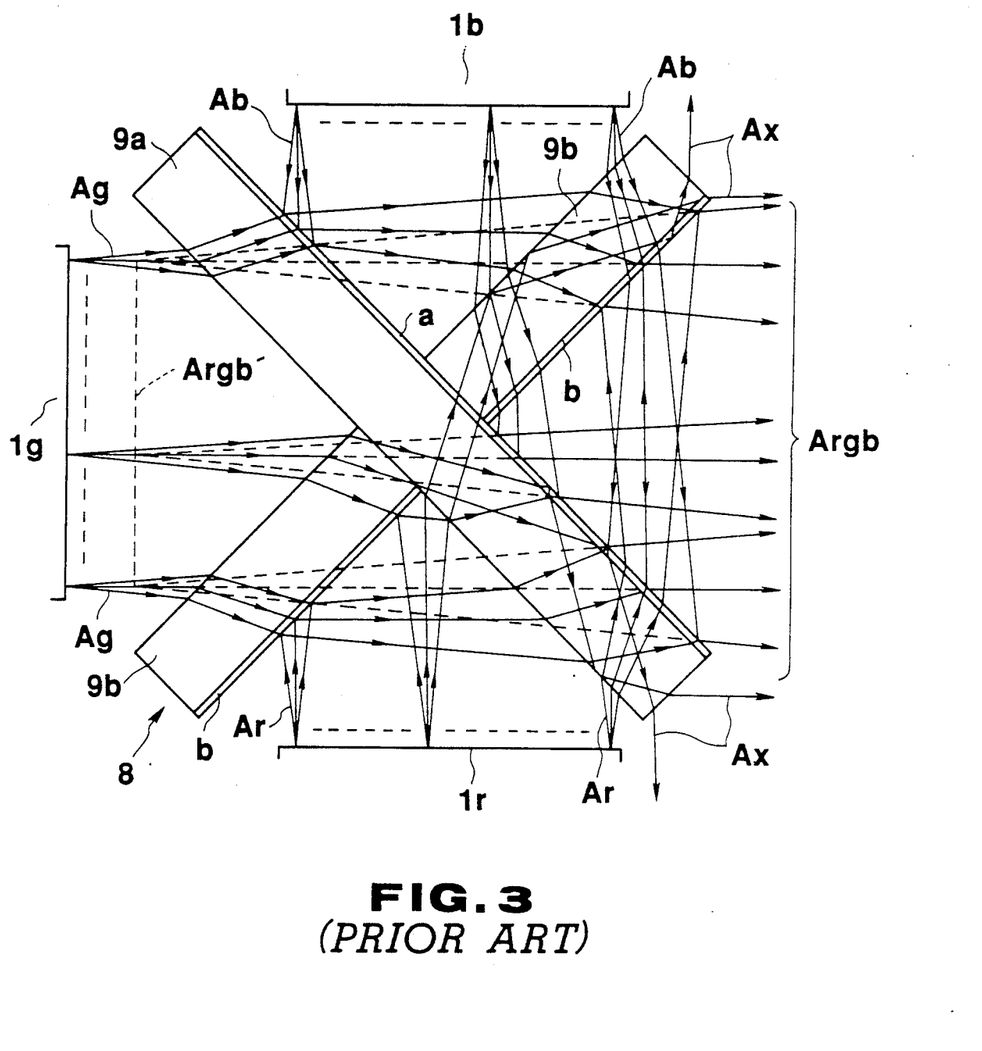
FIG. 3 is an enlarged view of the elongated X-shaped dichroic prism used in the projection type display apparatus of FIG. 2.

The projection type display apparatus shown in FIG. 2 employs an elongated X-shaped dichroic prism 8 instead of the image light synthesizer element 2 for combining the image lights from the display panels 1r, 1g and 1b. Other constructions of the display apparatus are similar to the projection type display apparatus of FIG. 1. As shown in FIG. 3, the elongated X-shaped dichroic prism 8 comprises a transparent plate 9a, one surface of which is coated with a dichroic coating layer a, and two transparent plates 9b and 9b, one surface of which is also coated with a dichroic coating layer b. One side edge of one of transparent plates 9b adheres to one surface of the transparent plate 9a at its center portion at right angles, and in the same way one side edge of the other transparent plate 9b adheres to the other side surface of the transparent plate 9a.

In the projection type display apparatus of FIG. 2, red-colored image light, green-colored image light and blue-colored image light from the display panels 1r, 1g and 1b are combined into one color image light with the above-mentioned elongated X-shaped dichroic prism 8 which is then are projected onto the screen 7. Now, it is assumed that the dichroic coating layer a of the transparent plate 9a of the elongated X-shaped dichroic prism 8 has characteristic that reflects the light component of blue color and allows light components of red and green colors to pass through the layer a and the dichroic coating layer b of the transparent plates 9b and also 9b, has characterstic that reflects the light component of red color and allows light components of blue color and green color to pass through the layer b. When, for example, the display panels 1r, 1g and 1b are disposed as illustrated in FIG. 2, the green-colored image light Ag entering the elongated X-shaped dichroic prism 8 from the green-colored image display panel 1g passes through the dichroic coating layers a and b as illustrated in FIG. 3, while the red-colored image light Ar from the red-colored image display panel 1r and the blue-colored image light Ab from the blue-colored image display panel 1b are reflected from the dichroic coating layers a and b, and are transmitted to the outgoing boundary surface of the elongated X-shaped dichroic prism 8. Therefore, the image lights Ar, Ag and Ab of red, green, and blue colors are combined into one color image light Argb and then are projected onto the screen 7. In FIG. 3, symbol Argb' denotes a virtual image of the color image light Argb combined by the elongated X-shaped dichroic prism 8.

As described above, it is a square-shaped dichroic prism which is employed in the conventional projection type display apparatus of FIG. 1 as an image light synthesizer element 2 which comprises four trigonal prisms 2a, 2b, 2c and 2d, for combining the image lights of red, green and blue colors from the display panels 1r, 1g and 1b into one color image light Argb. As the square-shaped dichroic prism is extremely expensive, the price of the display apparatus is very high.

Meanwhile, as described above, the projection type display apparatus of FIG. 2 employs the elongated X-shaped dichroic prism 8 as an image light synthesizer element, which prism comprises an elongated X-shaped combination of transparent plates 9a and 9b with the one side surface coated with a dichroic coating layer a or b. The transparent plates 9a and 9b of the elongated X-shaped dichroic prism 8 are cheaper compared to the trigonal prism. This results in a relatively inexpensive display apparatus.

However, the elongated X-shaped dichroic prism used in the conventional display apparatus has the following drawbacks. More specifically, image lights Ar, Ag and Ab from the display panels 1r, 1g and 1b enter and pass through the elongated X-shaped dichroic prism 8 but some of the image light beams which pass through the central portion of the dichroic prism 8 go out from the dichroic prism 8 as stray light beams Ax, as illustrated in FIG. 3. These stray light beams Ax can be a cause of poor quality of the image projected on the screen.

In the portion other than the central portion of the elongated X-shaped dichroic prism 8, the light beams passing through the transparent plates 9a, 9b are refracted in the normal direction at the outgoing boundary surfaces of the transparent plates 9a, 9b, while in the central portion of the elongated X-shaped dichroic prism 8, the light beams travel within the transparent plates 9a, 9b from their one end to the other end and are reflected by other transparent plate in the directions different from the normal direction. As illustrated in FIG. 3, some of these stray light beams Ax advance towards the outgoing boundary surface of the elongated X-shaped dichroic prism 8 (towards the projection lens 3) and the other light beams Ax advance aside from the outgoing boundary surface. The stray light beams Ax advancing towards the outgoing boundary surface of the elongated X-shaped dichroic prism 8 are projected onto the screen 7 through the projection lens 3, but since the stray light beams advance in a direction different from the direction of the light beams (color image light Argb) which are projected onto the screen 7 through the projection lens 3 to be focused thereon, the stray light beams are not focused on the screen 7, resulting in an out of focus image. The stray light beams Ax can be a cause of poor quality of the image projected on the screen 7 and the stray light beams Ax advancing aside from the outgoing boundary surface of the elongated X-shaped dichroic prism 8 are left useless.

SUMMARY OF THE INVENTION

The present invention has been made to remove the above-mentioned disadvantages and its object is to provide an elongated X-shaped prism which allows synthesis and separation of light without causing stray light.

Another object of the present invention is to provide a projection type display apparatus which uses an elongated X-shaped dichroic prism as an image light synthesizer element, which prism is inexpensive but causes no stray light, allowing an image of a high grade to be projected onto a screen.

To achieve the above-mentioned objects, according to the present invention, there is provided an elongated X-shaped optical device which comprises:
- a rectangular-solid member having top and bottom faces and four side-faces,
  - said member made of a material having refraction index nb, and
  - two side-faces of said member each coated with an optically controlling layer; and
- four transparent plates made of a material having refraction index na, said refraction index na of said transparent plates is lower than refraction index nb of said member,
  - one-side surfaces of said four transparent plates each coated with an optically controlling layer, and
  - a side-edge of the respective transparent plates adhering to corresponding side-face of said member.

The elongated X-shaped prism according to the present invention is inexpensive in price and allows easy synthesis and separation of light. Further, the projection type display apparatus uses an inexpensive elongated X-shaped dichroic prism as an image light synthesizer element and is capable of projecting an image of a high grade onto a screen, without causing stray light in the elongated X-shaped dichroic prism.

BRIEF DESCRIPTION OF THE DRAWINGS

The present invention will be more apparent from the following detailed description, when taken in conjunction with the accompanying drawings, in which.

DESCRIPTION OF THE PREFERRED EMBODIMENT

A preferred embodiment of the present invention will be described hereafter with reference to FIGS. 4 through 7.

Figure 4:
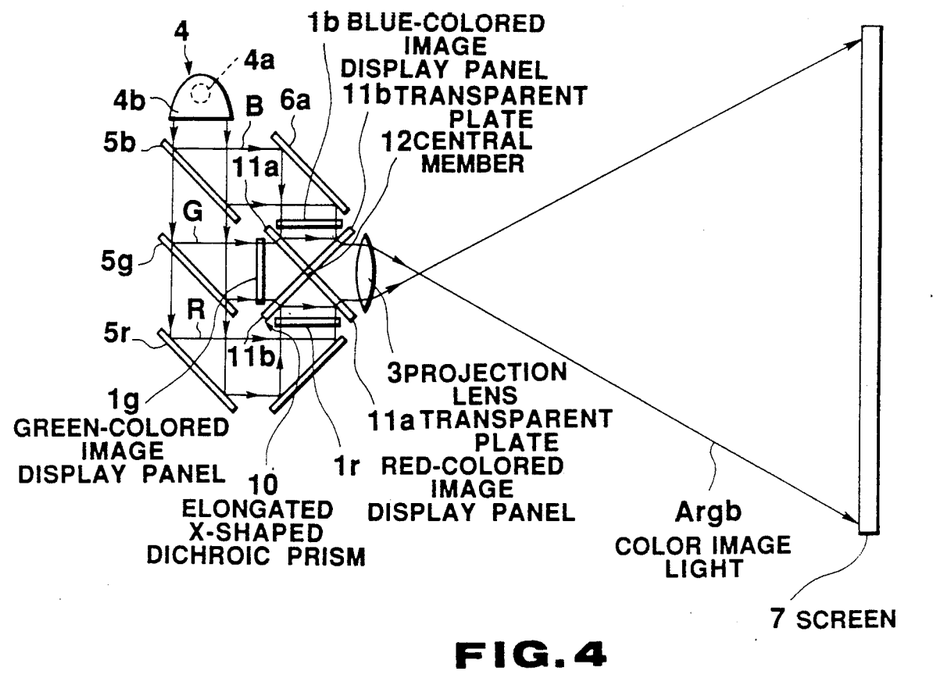
FIG. 4 is a view showing a projection type display apparatus using an elongated X-shaped dichroic prism according to the present invention.
Figure 5:
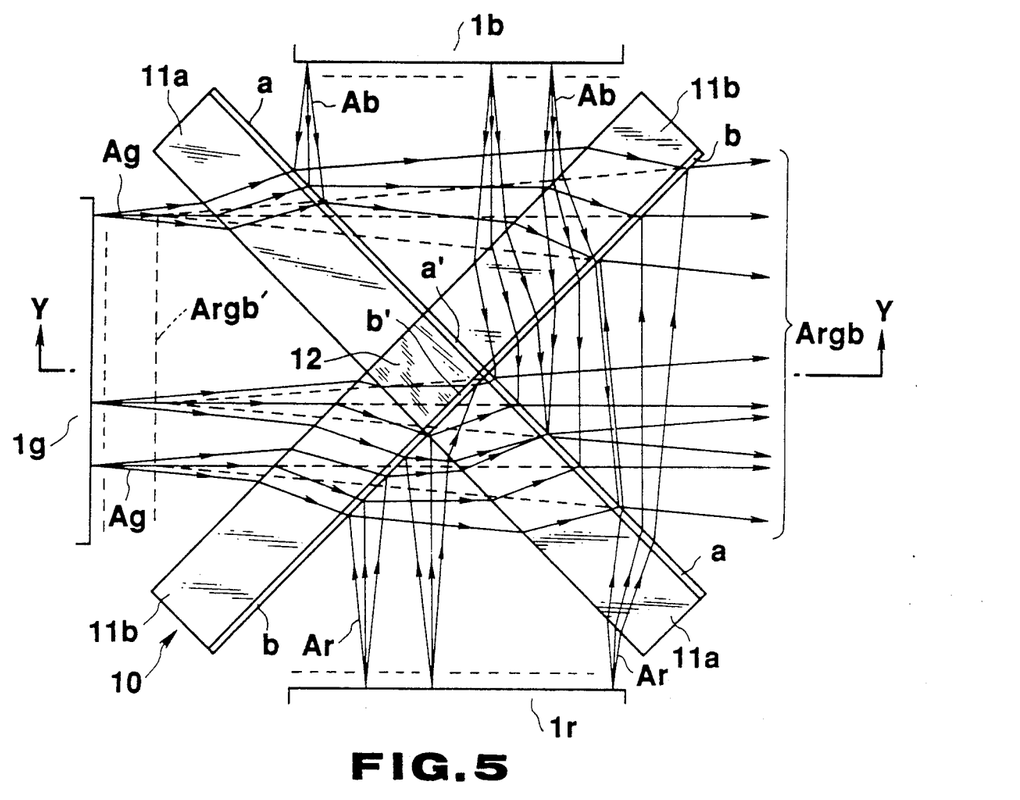
FIG. 5 is an enlarged view of the elongated X-shaped dichroic prism according to the present invention.

FIG. 4 is a view showing whole construction of a projection type display apparatus of the present invention. FIG. 5 is a view showing an elongated X-shaped dichroic prism for combining image lights.

The projection type display apparatus according to the present invention employs a display device comprising three liquid crystal display panels 1r, 1g and 1b for displaying a red-colored image, green-colored image and blue-colored image, respectively. The projection type display a apparatus combines red-colored image, green-colored image and blue-colored image from the liquid crystal display panels 1r, 1g and 1b into one color image Argb and then projects the color image onto a screen 7. An elongated X-shaped dichroic prism 10 illustrated in FIG. 5 is used as an image light synthesizer element which combines the red-colored image light, green-colored image light and blue-colored image light into one color image light Argb. The present embodiment of the projection type display apparatus has a similar construction to that of the conventional projection type display apparatus shown in FIGS. 1 and 2, except for the above-mentioned image light synthesizer element, i.e., elongated X-shaped dichroic prism 10. Accordingly, in the present embodiment, like reference symbols represent like elements of the conventional apparatus and a further description thereof will be omitted.

Now, the elongated X-shaped dichroic prism 10 will be described in detail with reference to FIG. 5. In FIG. 5, symbols 11a, 11a, 11b and 11b denote transparent plates (dichroic mirrors) with their one side surface coated with a dichroic coating layer. These transparent plates 11a, 11a, 11b and 11b are arranged so as to form a letter X. In other words, two adjacent transparent plates are arranged normal to each other, in the manner shown in FIG. 5. Each of the transparent plates 11a, 11a, 11b and 11b is made of transparent material such as glass, which has the same index of refraction. Further, these transparent plates are of the same thickness. The transparent plates 11a and 11a are arranged on one plane and are coated with a dichroic coating layer of same nature while the transparent plates 11b and 11b are arranged on another plane and are coated with a dichroic coating layer of the same nature different from the above coating layer. When the red-colored image display panel 1r, green-colored image display panel 1g and blue-colored image display panel 1b are disposed as illustrated in FIG. 5 with respect to the elongated X-shaped dichroic prism 10, the dichroic coating layers a and a of the transparent plates 11a and 11a reflect light component of blue color and allow light components of other colors to pass through them. The dichroic coating layers b and b of the transparent plates 11b, 11b reflect light component of red color and allow light components of green and blue colors to pass through them.

Symbol 12 denotes a central member of a square pole, each side of which has the same width as the thickness of the transparent plates 11a, 11a, 11b and 11b. One side edge of each transparent plate adheres to a side of the central member 12 so as to form a letter X shape.

The central member 12 is made of a transparent material such as glass, which has higher index of refraction than the transparent plates 11a, 11a, 11b and 11b.

The relationship between the refraction index nb of the central member 12 and the refraction index na of the transparent plates 11a, 11a, 11b and 11b is given by the following equation:

$$na = \sqrt{(nb^2 - 1)/2}$$

One side surface of the central member 12, which is on the same plane on which the dichroic coating layers a and a of the transparent plates 11a and 11a are disposed is coated with a dichroic coating layer a'. The dichroic coating layer a' has the same nature as the dichroic coating layer a of the transparent plates 11a and 11a. The other side surface of the central member 12, which is on the same plane on which the dichroic coating layers b and b of the transparent plates 11b and 11b are disposed is coated with a dichroic coating layer b'. The dichroic coating layer b' has the same nature as the dichroic coating layer b of the transparent plates 11b and 11b. A film of a high refraction index and a film of a low refraction index are evaporated alternatively in an overlapped manner to form the abovementioned dichroic coating layers a, b and a', b', which have appropriate natures of reflection and refraction of light.

Figure 7:
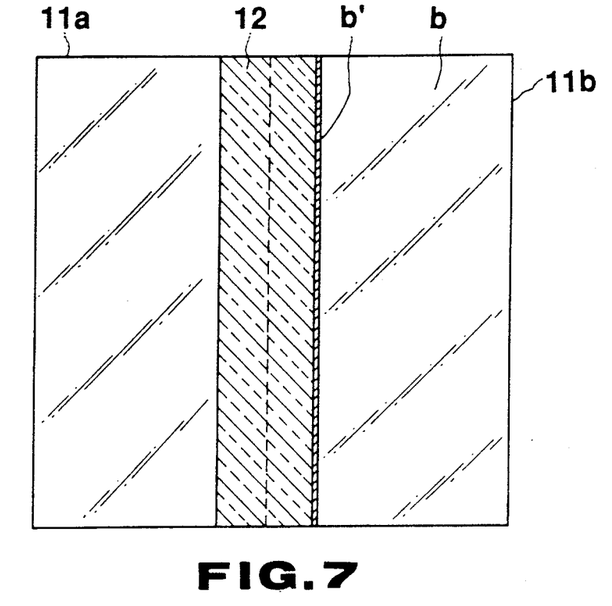
FIG. 7 is a sectional view of the elongate X-shaped dichoric prism according to the present invention.

FIG. 7 is a sectional view of the elongated X-shaped dichroic prism 10, taken along section line Y—Y in FIG. 5.

Figure 8:
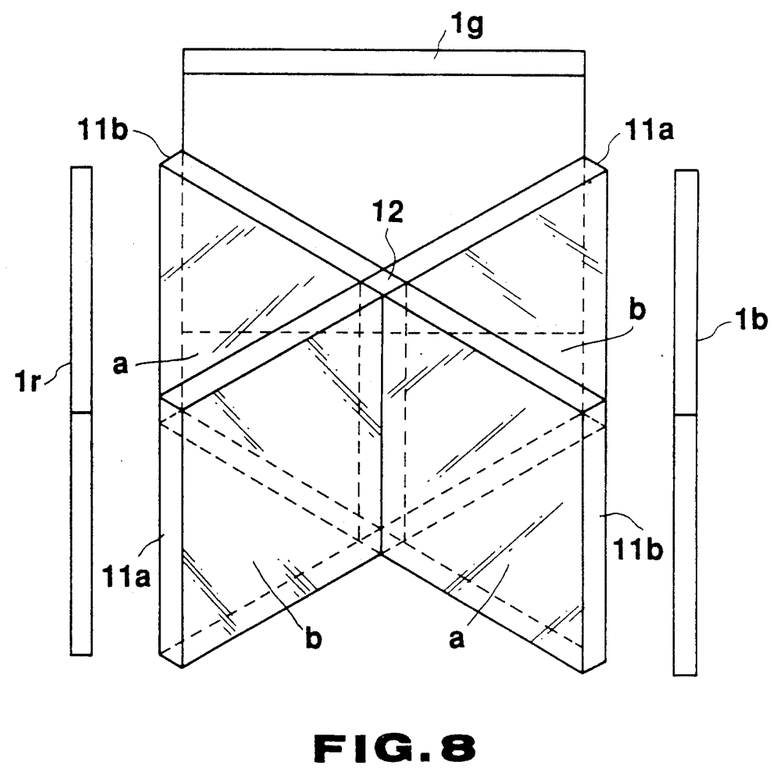
FIG. 8 is a perspective view of the elongated X-shaped dichroic prism of FIG. 5.

FIG. 8 is a perspective view of the elongated X-shaped dichroic prism 10.

The embodiment of the projection type display apparatus uses, as the image light synthesizer element, the elongated X-shaped dichroic prism 10 having the construction mentioned-above. In the present embodiment of the projection type display apparatus, image light of red color Ar, image light of green color Ag and image light of blue color Ab from the display panels 1r, 1g and 1b, are transmitted to the above elongated X-shaped dichroic prism 10 and then are combined into one color image light Argb. The color image light Argb reflected from the elongated X-shaped dichroic prism 10 is enlarged and projected through the projection lens 3 onto the screen 7. While a color image light Argb' shown in FIG. 5 is a virtual image of the color image light Argb combined by the elongated X-shaped dichroic prism 10.

The elongated X-shaped dichroic prism 10 used in the present embodiment comprises four transparent plates 11a, 11a, 11b and 11b, and the central member 12 of a square pole, one side edge of each of said transparent plates adhereing to a side surface of the central member 12 so as to form a shape like a letter X as seen from the top. The transparent plates 11a, 11a, 11b and 11b are coated with a dichroic coating layer a or b on their one surface while the surface of the central member 12 which is laid on the same plane as the dichroic coating layer a of the transparent plates 11a, 11a is coated with a dichroic coating layer a' which has the same nature as the dichroic coating layer a of the transparent plates 11a, 11a, and the other surface of the central member 12 which is laid on the same plane as the dichroic coating layer b of the transparent plates 11b, 11b is coated with a dichroic coating layer b' which has the same nature as the dichroic coating layer b of the transparent plates 11b, 11b. Since the elongated X-shaped dichroic prism 10 is constructed as mentioned above, the prism 10 causes no stray light and allows an image to be focused on the screen 7.

More specifically, since the refraction index of the central member 12 is higher than the transparent plates 11a, 11b, the construction of the elongated X-shaped dichroic prism 10 changes the direction of light passing through the central member of the prism 10. Light which enters one of the transparent plates 11a, 11b which are disposed perpendicular to each other, and which then passes through the central member 12 of the elongated X-shaped dichroic prism 10 and which again enters the other transparent plates is allowed to advance in the same direction as light passing through the portion other than the central member 12 of the elongated X-shaped dichroic prism 10.

Figure 6:
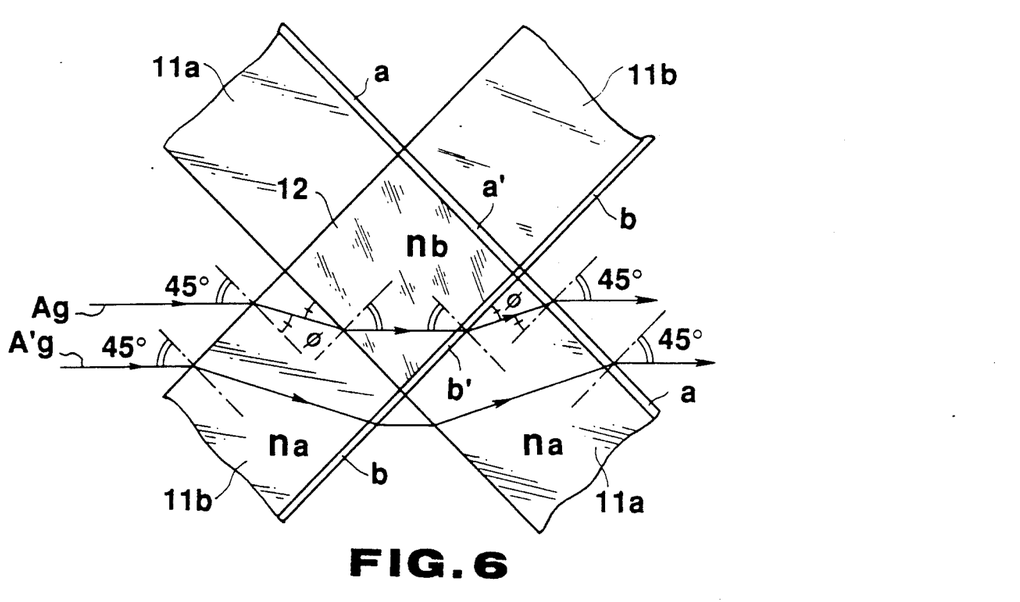
FIG. 6 is a view showing a direction of a light beam which passes through the central portion of the elongated X-shaped dichroic prism according to the present invention and a direction of a light beam passing through the portion other than the central portion of the prism.

FIG. 6 is a view schematically showing a course and direction of a light beam Ag' passing through the central member 12 of the elongated X-shaped dichroic prism 10 and those of a light beam Ag passing through the portion other than the central member 12 of the prism 10. In FIG. 6, green-colored image light from the green colored image display panel 1g are shown.

For simplicity, the course and direction of the light beams Ag, Ag' will be schematically described in FIG. 6. It is now assumed that main light beams Ag, Ag' (green colored image light) are parallel light beams which enter the transparent plate 11b at an incident angle of 45 deg. As illustrated in FIG. 6, the light beam Ag' enters the transparent plate 11b and goes out from the outgoing boundary surface (dichroic coating surface) b and again enters the transparent plate 11a and goes out from the outgoing boundary surface (dichroic coating surface) a at an outgoing angle of 45 deg, which is the same as the incident angle of 45 deg. More specifically, the light beam Ag' passing through the portion other than the central member 12 of the elongated X-shaped dichroic prism 10 goes out from the outgoing boundary surface a so as to trace an imaginary extended straight line of the incident light beam. In other words, the outgoing light beam Ag' from the outgoing boundary surface a takes the same course and the same direction as the light beam Ag' entering the transparent plate 11b. Meanwhile, the light beam Ag enters the transparent plate 11b, further enters the central member 12 from the transparent plate 11b and again goes into the transparent plate 11a from the central member 12. Finally, the light beam Ag goes out from the outgoing boundary surface (dichroic coating surface) a. Since the refraction index nb of the central member 12 is higher than the refraction index na of the transparent plates 11a, 11b, the incident light beam Ag from the transparent plate 11b to the central member 12 is refracted at the interfaces between the transparent plate 11b and the central member 12, and the transparent plate 11a and the central member 12, as illustrated in FIG. 6.

If a transparent material is used for the central member 12, a refraction index of which material allows the light beam Ag passing through the central member 12 to be refracted so as to have an same incident angle on the transparent plate 11a as the light beam Ag' passing through the portion other than the central member 12 of the elongated X-shaped dichroic prism 10, both the light beams Ag, Ag' are allowed to pass through the elongated X-shaped dichroic prism 10 in the same direction.

More specifically, a transparent material may be used as the central member 12, the refraction index of which material allows the light beam to go into the transparent material from the interface between the transparent plate 11b and the transparent material at an refraction angle of 45 deg. So as to meet this condition, the refraction index na of respective transparent plates 11a, 11b and the refraction index nb of the central member 12 should have the relationship stated below.

More specifically, in FIG. 6, assuming that the incident angle on the transparent plates 11a, 11b is 45 deg and the angle to the normal at which the light beam enters the transparent plates 11a, 11b, i.e., the refraction angle, is $\phi$, then following equation are given:

$$\text{SIN } 45° = na \text{ SIN } \phi \qquad (1)$$

$$na \text{COS } \phi = nb \text{ SIN } 45° \qquad (2)$$

When both the equations are satisfied, the refraction angle on the interface between the transparent plate 11b and the central member 12 will be 45 deg. at which angle a light beam goes into the central member 12.

The sum of the square of above equations is given as follows:

$$SIN^2 45° + na^2 SIN^2 b\ 45° = na^2(SIN^2\phi + COS^2\phi)$$

$$\tfrac{1}{2} + \tfrac{1}{2}nb^2 = na^2$$

hence, $na \approx \sqrt{(nb^2+1)/2}$ (3)

Accordingly, if the materials for the transparent plates 11a, 11b and the central member 12 of the elongated X-shaped dichroic prism 10 are selected such that their refraction indexes na, nb satisfy the above equation (3), then light beam Ag passing through the central member 12 and light beam Ag' passing through the portion other than the central member 12 will go out from the elongated X-shaped dichroic prism 10 in the same direction, and as a result there is no stray light. The red-colored image light Ar from the red-colored image display panel 1r and the blue-colored image light Ab from the blue-colored image display panel 1b pass through the elongated X-shaped dichroic prism 10 in a manner similar to the above-mentioned green-colored image light Ag so that no stray light results in these cases.

Virtual images of the red-, green- and blue-colored image lights Ar, Ag and Ab from the elongated X-shaped dichroic prism 10 are same in size as the images displayed on the display panels 1r, 1g and 1b, respectively. Therefore, if the display panels 1r, 1g and 1b are arranged such that their optical axes cross at the center of the elongated X-shaped dichroic prism 10, the red-, green- and blue-colored image lights Ar, Ag and Ab from display panels 1r, 1g and 1b can be superimposed by the elongated X-shaped dichroic prism 10 to synthesize a color image light Argb with no color distortion.

In the elongated X-shaped dichroic prism 8 used in the conventional projection type display apparatus, the dichroic coating layer a on the transparent plate 9a extends to the central portion of the elongated X-shaped dichroic prism 8 while the dichroic coating layer b on the transparent plate 9b does not extend to the central portion of the elongated X-shaped dichroic prism 8. Therefore, the light reflected from the dichroic coating layer b on the transparent plate 9b to pass through the central portion of the elongated X-shaped dichroic prism 8 is not reflected towards the outgoing side of elongated X-shaped dichroic prism 8. As a result, the color image light Argb synthesized by the elongated X-shaped dichroic prism 8 is subjected to distortion in color at its central portion. Meanwhile, in the above-mentioned embodiment of the present invention, the dichroic coating layers a', b' extend to the surfaces of the central member 12 of the elongated X-shaped dichroic prism 10. Accordingly, since the red-, green- and blue-colored image lights Ar, Ag and Ab which are to be reflected towards the outgoing side of elongated X-shaped dichroic prism 10 are also reflected from the central member 12 of the elongated X-shaped dichroic prism 10, a color image light Argb having a better color characteristic can be synthesized by the elongated S-shaped dichroic prism 10 with a high image quality.

In the above-mentioned embodiment, the central member 12 of the elongated X-shaped dichroic prism 10 is made of a rectangular solid member with the base of a square, but the central member 12 may be made of a rectangular solid member with the base of a rectangle, where the transparent plates 11a, 11b may be made of plates each having a thickness equal to length of the corresponding side of the central member 12. Further in the above embodiment, the display panels 1r, 1g and 1b are disposed so as to directly face the corresponding incident boundary surface of the elongated X-shaped dichroic prism 10, but the display panels 1r, 1g and 1b may be disposed to face, through a mirror, the corresponding incident boundary surface of the elongated X-shaped dichroic prism 10. The projection lens 3 is disposed at the outgoing side of the elongated X-shaped dichroic prism 10 in the above-mentioned embodiment, but the lens 3 may be disposed so as to face the elongated X-shaped dichroic prism 10 through a mirror. Further, the projection type display apparatus with liquid crystal display panels 1r, 1g and 1b has been described with reference to the embodiment, but cathode-ray tubes may be employed instead of the above liquid crystal display panels.

In the above embodiment, a projection type display apparatus has been described in which image lights of three colors such as red, green and blue from three display panels 1r, 1g and 1b are combined into one color image light Argb to be projected onto the screen 7. But the present invention may be used in a variety varios display apparatuses. In one example of such a display apparatus, each of the display panels 1r, 1g and 1b is divided into two display members each of which displays one half of one image and image lights of red, green and blue colors from these six display members are combined into one color image light, which is projected onto the screen 7 or the like. In an other example of such a display apparatus, one display member for displaying an image of one or two colors out of red, green and blue colors is disposed at the position of the red-colored image display panel 1r and another display member for displaying an image of the other one or two colors is disposed at the position of the blue-colored image display panel 1b, and image lights from the two display members are combined into one color image light, which is projected onto a projection screen. Further, in the above embodiment, in a case where a display member for displaying a red-colored image is disposed at the position of the red-colored image display panel 1r while a display member for displaying an image of green and blue colors is disposed at the position of the bluecolored image display panel 1b, and where the image lights from the two display members are combined into one color image light, a dichroic coating layer having features which reflect light components of green and blue colors and allow the light component of red color to pass through it may be coated on the surface of the transparent plate 11a and one side surface of the central member 12, and another dichroic coating layer having features which reflect the light component of red color and allow light components of green and blue colors to pass through it may be coated on the surface of the transparent plate 11b and other side surface of the central member 12.

What is claimed is:

1. An elongated X-shaped optical device comprising: a rectangular-solid member having top and bottom faces and four side-faces, said rectangular-solid member being made of a material having a refraction index nb, and two of said four side-faces of said rectangular-solid member being coated with an optically controlling layer; and four transparent plates each having two side surfaces and four side-edges, said four transparent plates being made of a material having a refraction index na which is lower than said refraction index nb of said rectangular-solid member, one of said two side-surfaces of each of said four transparent plates being coated with an optically controlling layer, and one of said four side-edges of each of said four transparent plates beign adhered to a respective one of said four side-faces of said rectangular-solid member to thereby form said X-shaped optical device.

2. An elongated X-shaped optical device according to claim 1, wherein said refraction index na of said four transparent plates and said refraction index nb of said rectangular solid member have the following relationship:

$$na \approx \sqrt{(nb^2 - 1)/2}$$

3. An elongated X-shaped optical device according to claim 1, wherein each of said four transaprent plates are arranged such that light entering said transparent plates from different directions is transmitted in one direction.

4. An elongated X-shaped optical device according to claim 1, wherein said four transparent plates are arranged such that light entering said transparent plates from different directions is transmitted in one direction.

5. An elongated X-shaped optical device according to claim 1, wherein said optically controlling layer of said transparent plates is coated on a surface of said transparent plates from which light is emitted.

6. An elongated X-shaped optical device according to claim 1, wherein said optically controlling layer comprises a dichroic layer.

7. An elongated X-shaped optical device according to claim 1, wherein said four transparent plates are arranged such that light enters said transparent plates at an incident angle of 45 degrees.

8. An elongated X-shaped optical device according to claim 1, wherein said four transparent plates are arranged such that light is emitted from said transparent plates at an outgoing angle of 45 degrees to the surface of said transparent plates.

9. An elongated X-shaped optical device according to claim 1, wherein at least one of said optically controlling layers has a different property of controlling light than others of said optically controlling layers.

10. An elongated X-shaped optical device according to claim 9, wherein said coated surfaces of said transaprent plates and said coated side-faces of said rectangular-solid member which lie in one plane are coated with optically controlling layers having the same light-controlling property.

11. An elongated X-shaped optical device according to claim 9, wherein two optically controlling layers of said optically controlling layers form two planar sheets which intersect perpendicularly to each other both of said two optically controlling layers having a different property of controlling light.

12. An elongated X-shaped optical device comprising:

four transparent plates each having one-side surface coated with an optically controlling layer, said four transparent plates being made of a material having a refraction index na, and said four transparent plates being aligned such that a combination of said four transparent plates forms a block in the shape of a letter X; and a rectangular-solid member having four side-faces and top and bottom faces, said rectangular-solid member being made of a transparent material which has a refraction index nb which is higher than said refraction index na of said four transparent plates, two of said four side-faces of said rectangular-solid member being coated with an optically controlling layer, and said rectangular-solid member being at the center of the aligned combination of said four transparent plates forming said block in the shape of the letter X with said four side-faces thereof being aligned to a respective one of said four transparent plates.

13. A projection apparatus comprising: a prism comprising:

four transparent plates each having one-side surface coated with an optically controlling layer, said four transparent plates being made of a material having a refraction index na, and said four transparent plates being aligned such that a combination of said four transparent plates forms a block in the shape of a letter X; and a rectangular-solid member made of transparent material which has a refraction index nb which is higher than said refraction index na of said four transparent plates, said rectangular-solid member havint top and bottom faces and four side-faces, two of said four side-faces of said rectangular-solid member being coated with an optically controlling layer, and said rectangular solid member being at the center of the aligned combination of said four transparent plates forming said block in the shape of the letter X with said four side-faces thereof being adhered to a respective one of said four transparent plates to thereby form the prism;

a plurality of display devices facing said prism; and a projection lens provided at a light emitting side of said prism for projecting image light emitted from said prism.

14. A projection apparatus according to claim 13, wherein said refraction index na of said four transparent plates and said refraction index nb of said rectangular solid member have the following relationship:

$$na \approx \sqrt{(nb^2 - 1)/2}$$

15. A projection apparatus according to claim 13, wherein each of said four transaprent plates has a thickness equal to the width of each of said four side-faces of said rectangular solid member.

16. A projection apparatus according to claim 13, wherein said four transparent plates are arranged such that light entering said transparent plates from different directions are transmitted in one direction.

17. A projection apparatus according to claim 13, wherein said optically controlling layer of said transparent plates is coated on a surface of said transparent plates from which light is emitted.

18. A projection apparatus according to claim 13, wherein said optically controlling layer comprises a dichroic layer.

19. A projection apparatus according to claim 13, wherein said four transparent plates are arranged such that light entering said prism enters said transparent plates at an incident angle of 45 degrees.

20. A projection apparatus according to claim 13, wherein said four transparent plates are arranged such that light is emitted from said transparent plates at an outgoing angle of 45 degrees to the surface of said transparent plates.

21. A projection apparatus according to claim 13, wherein at least one of said optically controlling layers has a different property of controlling light than others of said optically controlling layers.

22. A projection apparatus according to claim 21, wherein said coated surfaces of said transparent plates and said coated side-faces of said rectangular-solid member which lie in one plane are coated with optically controlling layers having the same light-controlling property.

23. A projection apparatus according to claim 21, wherein two optically controlling layers of said optically controlling layers form two planar sheets which intersect perpendicularly to each other both of said two optically controlling layers having a different property of controlling light.

24. An elongated X-shaped optical device comprising:
four transparent plates each with one side surface coated with an optically controlling layer, said four transparent plates being aligned such that of the combination of said four transparent plates forms a block in the shape of a letter X; and
a rectangular-solid member having four side-faces and top and bottom faces, two of said four side-faces of said rectangular-solid member being coated with an optically controlling layer, and said rectangular-solid member being at the center of the aligned combination of said four transparent plates forming said block in the shape of the letter X with said four side-faces thereof being adhered to a respective one of said four transparent plates.

* * * * *

UNITED STATES PATENT AND TRADEMARK OFFICE
CERTIFICATE OF CORRECTION

PATENT NO. : 5,042,912
DATED : August 27, 1991
INVENTOR(S) : SATO et al

It is certified that error appears in the above-identified patent and that said Letters Patent is hereby corrected as shown below:

Column 11, line 11 (claim 1), "beign" should read --being--.

Column 11, lines 23-25 (claim 3), replace "are arranged...in one direction." with --has a thickness equal to the width of each of said four side-faces of said rectangular solid member.--

Column 12, line 14 (claim 12), "aligned" should read --adhered--.

Column 12, line 29 (claim 13), "havint" should read --having--.

Column 12, line 54 (claim 16), "transparent plates" should read --prism--.

Signed and Sealed this

Thirtieth Day of March, 1993

Attest:

STEPHEN G. KUNIN

Attesting Officer     Acting Commissioner of Patents and Trademarks